United States Patent
Huret

(10) Patent No.: US 7,103,592 B2
(45) Date of Patent: Sep. 5, 2006

(54) METHOD AND APPARATUS PROVIDING RECOMMENDATIONS BASED ON AUTOMATICALLY ENRICHED USER PROFILE

(75) Inventor: Augustin Huret, Eulmont (FR)

(73) Assignee: Pertinence Data Intelligence, Paris (FR)

(*) Notice: Subject to any disclaimer, the term of this patent is extended or adjusted under 35 U.S.C. 154(b) by 500 days.

(21) Appl. No.: 10/381,249

(22) PCT Filed: Sep. 14, 2001

(86) PCT No.: PCT/FR01/02856

§ 371 (c)(1),
(2), (4) Date: Mar. 24, 2003

(87) PCT Pub. No.: WO02/27566

PCT Pub. Date: Apr. 4, 2002

(65) Prior Publication Data

US 2003/0187835 A1    Oct. 2, 2003

(30) Foreign Application Priority Data

Sep. 27, 2000   (FR) ................... 00 402666

(51) Int. Cl.
G06F 7/00        (2006.01)
G06F 17/30       (2006.01)
G06Q 30/00       (2006.01)
G06G 1/00        (2006.01)

(52) U.S. Cl. .................. 707/3; 707/5; 707/10; 705/10; 705/14; 705/26

(58) Field of Classification Search ............. 707/3, 707/5, 10; 705/10, 14, 26
See application file for complete search history.

(56) References Cited

U.S. PATENT DOCUMENTS

| | | | |
|---|---|---|---|
| 4,996,642 A | * | 2/1991 | Hey .......................... 705/27 |
| 5,583,763 A | * | 12/1996 | Atcheson et al. ............. 707/3 |
| 5,592,375 A | | 1/1997 | Salmon et al. |
| 5,710,884 A | * | 1/1998 | Dedrick ..................... 709/217 |
| 5,724,567 A | * | 3/1998 | Rose et al. ................... 707/2 |
| 5,749,081 A | * | 5/1998 | Whiteis ..................... 707/102 |
| 5,848,396 A | * | 12/1998 | Gerace ....................... 705/10 |
| 5,884,282 A | * | 3/1999 | Robinson .................... 705/27 |
| 5,890,152 A | | 3/1999 | Rapaport et al. |
| 5,930,764 A | * | 7/1999 | Melchione et al. .......... 705/10 |
| 6,003,020 A | * | 12/1999 | Hazlehurst et al. .......... 706/11 |
| 6,012,051 A | | 1/2000 | Sammon et al. |

(Continued)

OTHER PUBLICATIONS

Bauer et al. "Using Document Access Sequences to Recommend Customized Information." Information Customization. © 2002 IEEE, pp. 27-33.*

(Continued)

Primary Examiner—Don Wong
Assistant Examiner—Charles Lu
(74) Attorney, Agent, or Firm—Young & Thompson

(57) ABSTRACT

A system for automatically complementing a profile partially specified by a user, based on profiles of other users of the systems. Complemented attributes of the profile can be used to search for recommended products or services in a partner dataset. User profiles are stored in a database table with multiple fields and the complementation of the fields, in response to a request to the server, is proposed as a list of possible values for each field. These suggested values can be matched with products or services descriptions in order to retrieve those that the user initiating the request might be interested in even though they did not appear explicitly in his profile in the first place.

21 Claims, 4 Drawing Sheets

U.S. PATENT DOCUMENTS

| | | | | |
|---|---|---|---|---|
| 6,041,311 | A * | 3/2000 | Chislenko et al. | 705/27 |
| 6,049,777 | A * | 4/2000 | Sheena et al. | 705/10 |
| 6,134,532 | A * | 10/2000 | Lazarus et al. | 705/14 |
| 6,236,978 | B1 * | 5/2001 | Tuzhilin | 705/26 |
| 6,286,005 | B1 * | 9/2001 | Cannon | 707/100 |
| 6,334,127 | B1 * | 12/2001 | Bieganski et al. | 707/5 |
| 6,356,879 | B1 * | 3/2002 | Aggarwal et al. | 705/26 |
| 6,507,851 | B1 * | 1/2003 | Fujiwara et al. | 707/104.1 |
| 2001/0021914 | A1 * | 9/2001 | Jacobi et al. | 705/8 |

OTHER PUBLICATIONS

Fruchtl et al. "Assistant for an Information Database." CIKM '97. © 1997 ACM, pp. 230-237.*

Kim et al. "Learning Implicit User Interest Hierarchy for Context in Personalization." IUI '03. © 2003 ACM, pp. 101-108.*

Kitts et al. "Cross-sell: A Fast Promotion-Tunable Customer-item Recommendation Method Based on Conditionally Independent Probabilities." KDD 2000. © ACM 2000. pp. 437-446.*

Widyantoro et al. "An Adaptive Algorithm for Learning Changes in User Interface." CIKM '99. © 1999 ACM, pp. 405-412.*

Salton G et al:, Term-Weighting Approaches in Automatic Text Retrieval Information Processing & Management, GB Elsevier, Barking, vol. 24, No. 5, 1988, pp. 513-523, XP000716208, ISSN: 0306-4573, *p. 517, ligne 24- p. 518, ligne 9; tableaux 1, 2.

* cited by examiner

METHOD AND APPARATUS PROVIDING RECOMMENDATIONS BASED ON AUTOMATICALLY ENRICHED USER PROFILE

BACKGROUND OF THE INVENTION

The present invention relates to a search engine intended for extracting a list of data from a database in response to a request, in particular so as to extract from a database response data designating a product or service to be supplied by a supplier to a customer, as well as a computer aided process (CAP) implementing the search engine so as to make personalized commercial offers.

DESCRIPTION OF THE RELATED ART

Computer databases have multiple uses. For example, in a known manner, a commercial enterprise can group together, within computer databases, a great deal of information concerning its customers so as to use this information for marketing purposes. For example, the profession, the place of residence, the age, the tastes of its customers may enable an enterprise to best tailor its offer. Moreover, in a known manner, a telecommunication network allows various branches of one and the same enterprise to easily pool these data from remote sites. In such a system, the data gathered, are very diverse and very voluminous.

When a large amount of data are stored in a base, they must subsequently be processed automatically so as to extract therefrom information useful for a specific aim, for example to make a particular customer, real or potential, a personalized commercial offer liable to meet his interest. A known processing means consists in using a software engine for searching for character strings. Such a search engine is capable of extracting from the records stored in a database those which contain a predetermined character string, for example a word or group of words.

A known search engine such as this has drawbacks: searching for a character string does not make it possible to specify the context of use of said word or group of words, or its meaning, which may be manifold, so that the records extracted by such an engine have a volume which increases and a relevance which decreases with the volume of the database, thereby reducing their utility.

The computer aided process for making a commercial offer with the help of the database described hereinabove also has drawbacks: the gathering, the storage and the processing of the data have a cost which is borne entirely by the enterprise that owns the base and which increases with the amount of data. Moreover, a given enterprise can only collect data about the limited number of parties with which it maintains contacts within the framework of its normal activity, for example about its own customers and, suppliers. If these data have to be purchased from another source of data, they also entail a cost overhead for the enterprise.

Furthermore, numerous enterprises use computers to carry out transactions and/or supply products or services to customers by way of telecommunication networks. The occupation of the memory of said computers by a database such as described above and the mobilization of their computational capabilities in respect of the processing of said data have drawbacks such as the reducing of the throughput of information exchanged by said computers with said customers, the slowing down of the activity and ultimately the reducing of the productivity of the enterprise. To overcome this drawback, the enterprise must equip itself with very high-performance computers, thereby also entailing a cost overhead for itself.

SUMMARY OF THE INVENTION

A first aim of the present invention is to provide a search engine which does not have the aforesaid drawbacks.

To do this, the search engine according to the invention comprises a set of instruction codes executable by an interrogation computer terminal so as to construct a request and another set of instruction codes executable by a search computer terminal so as to extract a list of response data to said request from a database, the interrogation terminal and the search terminal being linked by a telecommunication network.

In a second embodiment, the set of instruction codes executable by the search computer terminal makes it possible to receive and to execute contact commands issued from other computer terminals, the so-called partner terminals, linked to the telecommunication network. In this second embodiment, the search terminal executes a contact command by sending an interrogation software module to the interrogation terminal so as to construct a request, certain characteristics of which are predetermined as a function of the partner terminal from which the contact command originates.

In a third embodiment, the search terminal also comprises a partner-database, preferably containing information about products and/or services intended to be supplied by the partner terminal. The set of instruction codes executable by the search computer terminal makes it possible to filter the response data and to choose the recipient of the response list as a function of the partner-data.

A second aim of the present invention is to provide a computer aided process which does not have the aforesaid drawbacks.

To do this, a second subject of the invention is a computer aided process as defined in claim 20 hereinbelow.

BRIEF DESCRIPTION OF THE DRAWINGS

The invention will be better understood, and other aims, details, characteristics and advantages thereof will become more clearly apparent in the course of the following description of several particular embodiments of the invention, given solely by way of nonlimiting illustration, with reference to the appended drawing. In this drawing:

FIG. 2 is an example of content of a database with which the search engine co-operates;

FIG. 3 is an example of a response generated by the search engine which co-operates with the database of FIG. 2;

DESCRIPTION OF THE PREFERRED EMBODIMENT

Figure 1:
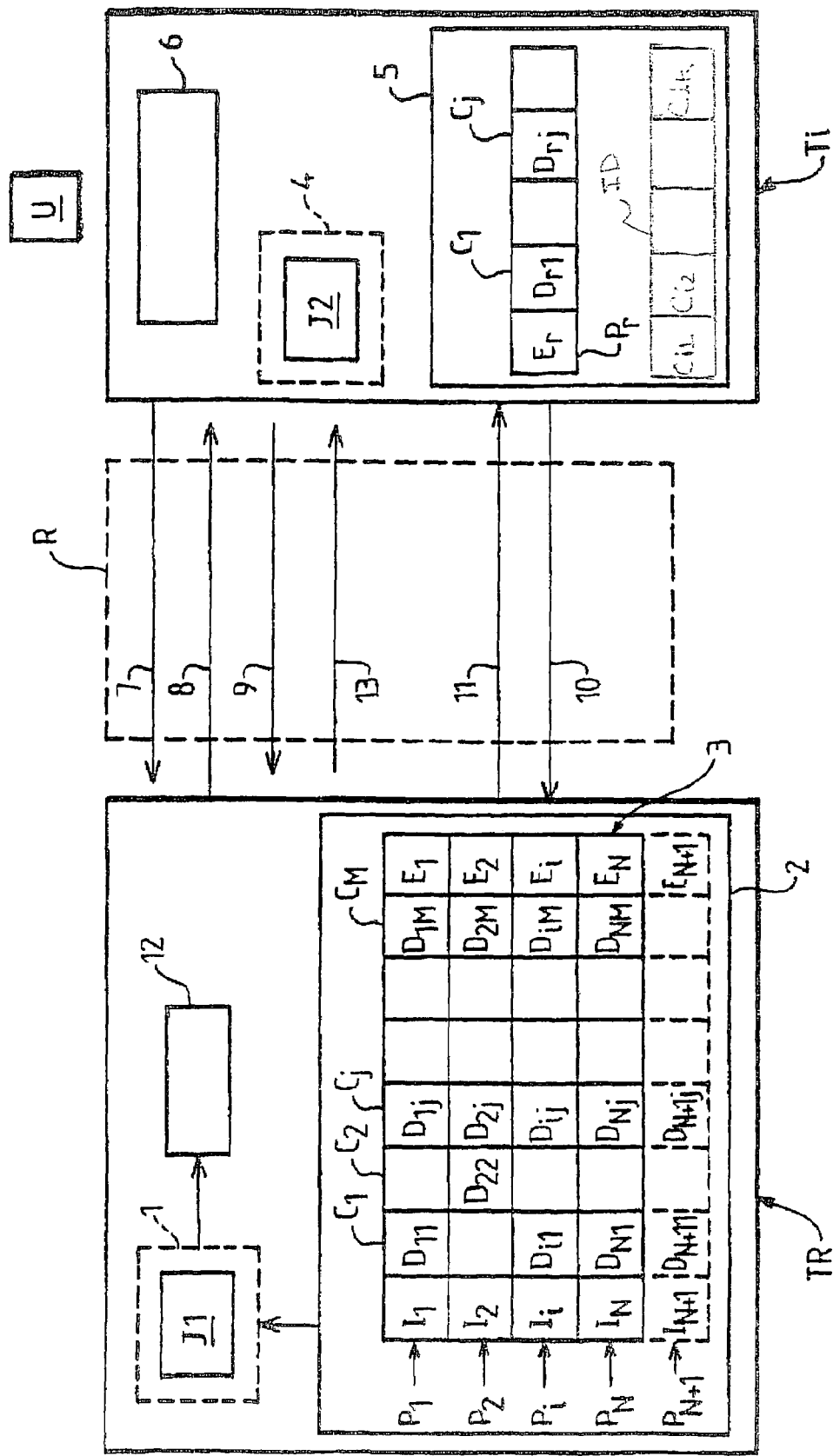
FIG. 1 is an operating diagram of the search engine according to the invention whose instructions are executed jointly by a search computer terminal and by an interrogation computer terminal which are linked by a telecommunication network.

The manner of operation of the search engine will now be described with reference to FIG. 1. The search engine comprises a first set J1 of instruction codes intended to be executed by a search computer terminal TR. The search terminal TR conventionally comprises a processor 1 and storage means 2, comprising for example a computer memory and/or a hard disc and/or an optical disc reader/rewriter and/or any other means. A database 3 comprising data intended to be processed by the search engine is stored in said storage means 2.

The database 3, of matrix structure, comprises N rows called profiles, denoted P1 to PN, and M columns called fields, denoted C1 to CM, N and M being two integers greater than or equal to 1. Each profile Pi, i being an integer lying between 1 and N, contains a plurality of data Dij, each data item Dij being associated with a field Cj, j being an integer lying between 1 and M. Each profile contains at least one data item Dij, but does not necessarily contain data Dij associated with all the fields of the base. Thus, as visible in FIG. 1, the profile P1 contains the data item D11 associated with the field C1 and does not contain any data item associated with the field C2. Each profile Pi of the base 3 also comprises a profile index number Ii to identify it uniquely and an identifier Ei, for example a character string, said identifier Ei being different for each profile. Each data item Dij of the base 3 comprises an alphanumeric character string. Each profile Pi is of the base 3 has been defined by a user of the search engine, as will be explained later, and contains information which this user did indeed wish to supply, in particular information about himself, about his tastes and his preferences, especially as regards consumption, etc. Each field Cj of the base 3 groups together a predetermined category of data, that is to say the character strings of the various data Dij associated with one and the same field Cj denote various possible responses to the same question. For example, the field C5 can pertain to dates of birth.

All the data Di5 of the base 3 are then dates of birth supplied by users of the search engine. The question defining the field C5 is: what is your date of birth?

The search terminal TR is linked by a telecommunication network R to other computer terminals, the so-called interrogation terminals TI. For example, the telecommunication network R may be the Internet and the interrogation terminals TI may comprise a multitude of interrogation terminals linked to this network. Conventionally, each computer terminal linked to the network R is identified by an address which makes it possible to enter into communication with it. The communications between computer terminals by way of the network R are performed according to conventional communication protocols, such as for example the TCP/IP protocol.

Any one of the interrogation terminals TI conventionally comprises a processor 4, a memory unit 5, interface means 6, for example a screen and/or a keyboard and/or a mouse, to enable a user U of the interrogation terminal TI to read and to write data and to execute instructions. When a logon command, represented by the arrow 7, is received by the search terminal TR from an interrogation terminal TI, it responds to the interrogation terminal TI by sending it an interrogation software module 8, for example in the form of files in the HTML, JAVASCRIPT and/or other language, which comprises a second set J2 of instruction codes. The instruction codes J2 are then executed by the interrogation terminal TI so as to enable the user U to generate a request to be processed by the search engine.

To do this, the instruction codes J2 firstly enable the user U to associate reference data Drj with fields Cj of the database 3, said fields Cj being chosen within a predetermined collection of accessible fields which comprises the totality or a part of the fields Cj of the base 3. For each accessible field Cj, the associated reference data item Drj can be typed on a keyboard by the user U or be chosen among a predetermined list of optional data associable with the field Cj, said list being contained in the software module 8 received from the search terminal TR. When he associates the reference data Drj of his choice with the accessible fields Cj of his choice, the user U generates a reference profile Pr, which is temporarily stored in the memory unit 5, possibly for an unlimited duration. The user U is invited to supply the reference data Drj in response to a question which is asked by way of the interface means 6. The question asked is that which defines the corresponding field Cj. For example, the field C2 pertains to the month of birth of the user U, the question which defines it is: "what is your month of birth?" and the list of optional data associable with the field C2 comprises the names of the twelve months of the year. The instruction codes J2 also enable the user U to identify the reference profile Pr by an identifier Er of his choice, for example a pseudonym and a password.

In order to save the profile generated by the user U, the instruction codes J2 make it possible to send the reference profile Pr accompanied by its identifier Er to the search terminal TR, as represented by the arrow 10, so as to concatenate the reference profile Pr with the database 3. The search terminal TR compares the identifier Er of the profile received with the identifiers E1 to EN of the profiles of the base 3. If, no profile Pi of the base 3 has its identifier identical to the identifier received Er, the reference profile Pr is saved as new profile $P_{N+1}$ in the base 3, as represented by dashed lines in FIG. 1. Each data item Drj(j=1 to M) of the reference profile is then saved as data item $D_{N+1,j}$ of the new profile $P_{N+1}$ of the base 3.

If the identifier Er is identical to the identifier Ei of a profile Pi already stored in the base 3, two cases arise:
  if the user U had previously supplied the identifier Ei so as to download the profile Pi as reference profile Pr, as will be explained later, the reference profile Pr is saved as replacement for the profile Pi of the base 3.
  if the user U had not previously supplied the identifier Ei so as to download the profile Pi as reference profile Pr, the search terminal TR sends the interrogation terminal TI a message signaling that the chosen identifier Er is not available and inviting the user U to choose another identifier Er;
  After the user U has saved a profile Pi in the base 3, for example during his first use of the search engine, he may download this saved profile Pi so as to generate his reference profile Pr during his subsequent uses of the search engine. Thus, the user U is not forced to generate his reference profile Pr from scratch each time. To do this, the instruction codes J2 enable the user U to send the search terminal TR a profile identifier to be downloaded, as represented by the arrow 10. In response to the profile identifier received, the instruction codes J1 are then executed by the search terminal TR so as to compare this received identifier with the identifiers Ei (i=1 to N+1) of the profiles of the base 3. If an identifier Ei identical to the identifier received exists, the corresponding profile Pi is sent to the interrogation terminal TI, as represented by the arrow 11. If there is no corresponding profile in the base 3, an error message can be sent in response to the interrogation terminal TI.

The profile Pi sent by the search terminal TR is then stored as reference profile PR in the memory 5 of the interrogation terminal TI, each data item Dij (j=1 to M) of the profile Pi being stored as data item Drj of the profile Pr, the identifier Ei being stored as identifier Er of the profile Pr. The user U can then change the downloaded reference profile Pr, by adding data Drj to the profile Pr or by modifying the data Drj received. On the other hand, the user U cannot modify the identifier Ei of the profile received, so as to prevent him from replicating the profile Pi several times in the base 3 under various identifiers.

Thus, by generating a profile Pr during the first use of the search engine, then by saving this profile Pr as, profile Pi of the base 3, then by downloading with each new use this profile Pi as reference profile Pr, each time adding new reference data Drj to the downloaded profile Pr, said reference data being associated with accessible fields, then by saving this profile Pr each time as profile Pi of the base 3, each user U of the search engine progressively constructs a profile Pi which is personal to him and which contains more and more information. This user U thus assists in gradually filling in the database 3.

In a variant (not represented), the instruction codes J2 are executed by the interrogation terminal TI so as to allocate, in a manner which may or may not be known to the user U, an identifier K to the interrogation terminal TI, the identifier K possibly being included in a "cookie" file stored in the memory 5. The identifier K is then automatically used as identifier Er of the reference profile Pr generated and/or as identifier Ei of the profile Pi to be downloaded.

In a variant (not represented), the user U may give a reference profile Pr that he has generated from scratch, without prior downloading, the identifier Ei of a profile Pi already stored in the base 3 and may send this reference profile Pr to the search terminal so as to concatenate it with the base 3. In this variant, instead of responding through a message signaling that the identifier Ei is not available, the search engine replaces the data Dij of the stored profile Pi with the nonempty data Drj of the profile received without affecting the data Dij of the stored profile Pi which are associated with fields Cj for which the profile Pr received does not contain an associated data item.

At the conclusion of the step of generating the reference profile Pr, the latter contains at least one data item Drj associated with an accessible field Cj. In the example represented in FIG. 1, the reference profile Pr generated also contains a data item Dr1 associated with the field C1. The instruction codes J2 thereafter enable the user U to send the request to the search terminal TR, as represented by the arrow 9. The request 9 sent comprises the reference profile Pr and the designation of an interrogation domain. The designated interrogation domain (ID), is a collection (Ci1, Ci2, . . . , Cik) of k elements, each element being one of the fields Cn of the database 3, the number k being at least one and at most equal to the number of fields in database 3. The fields Cm of the interrogation domain are predetermined by the software module 8 or are chosen by the user U.

Figures 2, 3:
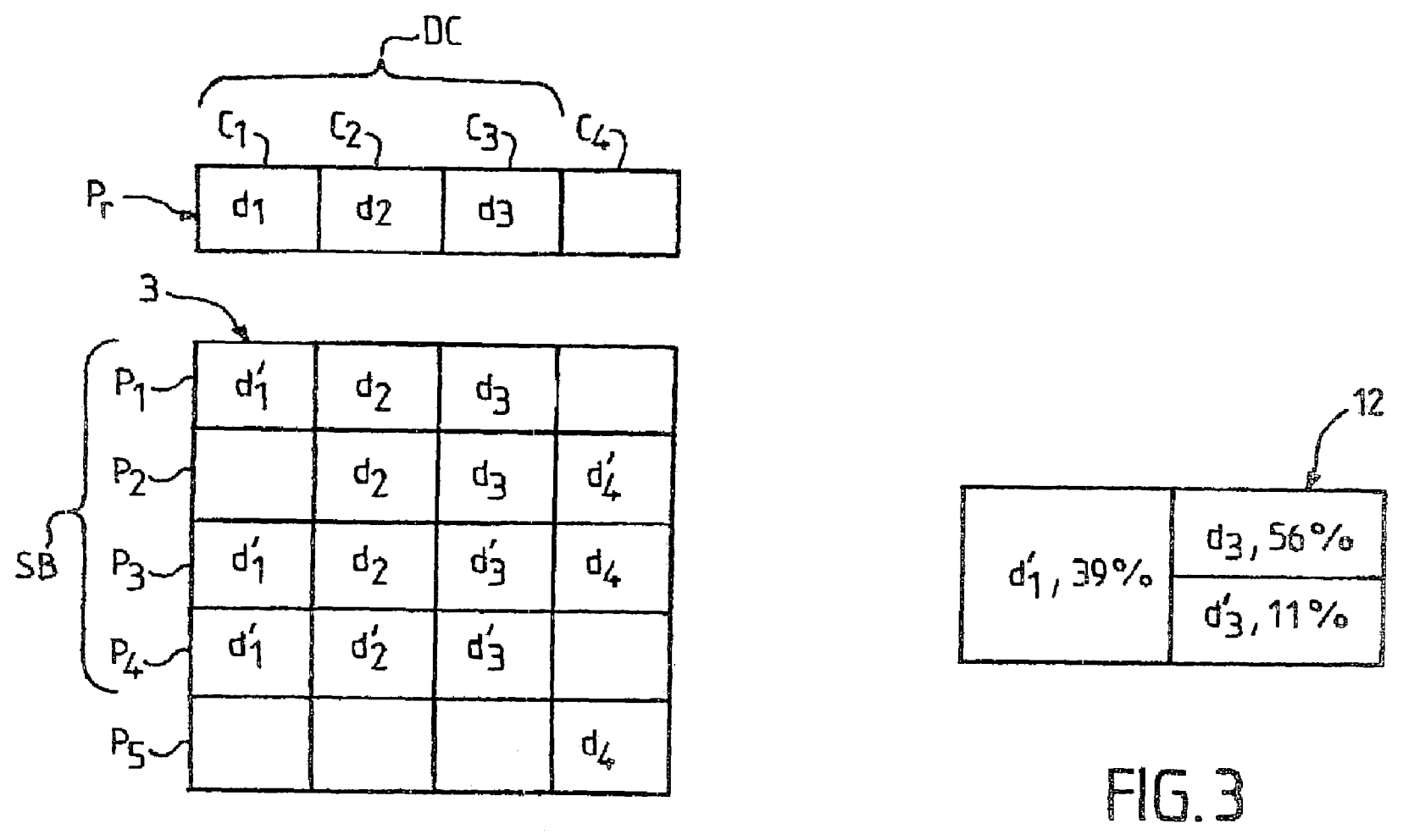

After receipt of the request 9 sent by the interrogation terminal TI, the instruction codes J1 are executed by the search terminal TR so as to process the request 9 by following a predetermined algorithm, which will now be described with reference to an example represented in FIG. 2. The request of the example comprises the reference profile represented in FIG. 2 and designates the fields C1 and C3 as the interrogation domain.

In a first step, a sub-base SB, containing profiles Pk to be compared with the reference profile Pr of the request 9, is extracted from the database 3. In a first variant of the search engine, the sub-base SB comprises the totality of the profiles of the base 3. In a second variant, the sub-base SB consists of all the profiles Pi of the database comprising a data item Dim associated with at least one of the fields Cm of the interrogation domain of the request 9. In the example, where the second variant is illustrated, the sub-base SB extracted comprises the profiles P1, P2, P3 and P4, but not the profile P5 which does not contain any data item associated either with C1 or with C3.

In a second step, a distinct occurrence Qn is calculated for each field Cn of a comparison domain DC, said comparison domain DC consisting of all the fields Cj of said database 3 with which a data item Drj of said reference profile Pr is associated. In the example, the comparison domain contains the fields C1, C2 and C3. The calculation of the occurrence counters Qn comprises the steps consisting successively in:

a) selecting a field Cn of said comparison domain (for example field C2), b) once for each profile Pk of the sub-base SB (that is to say for the profiles P1 to P4 of the example), performing a test of correspondence between the reference profile Pr data item Drn associated with the field Cn, the so-called reference data item (that is to say the data item d2 of the example), and the data item Dkn of the profile Pk of the sub-base SB associated with said field Cn, the so-called data item to be compared (that is to say the data item d2 of the profile P1, the data item d2 of the profile P2, the data item d2 of the profile P3 and the data item $d_2'$ of the profile P4). The result of the test of correspondence is a boolean number, true if and only if the data item to be compared Dkn is in correspondence through a predetermined logic law with the reference data item Drn. The result of the test is in particular false when said data item to be compared is empty or non-existent. The logic law provides that two data items are in correspondence when they are identical. In the example, the result of the test is true for the data item d2 of the profile P1, true for the data item d2 of the profile P2, true for the data item d2 of the profile P3 and false for the data item $d_2'$ of the profile P4. The data being character strings, the logic law can also be chosen so that the data item to be compared Dkn is in correspondence with the reference data item Drn when the former contains a substantial part of the latter. For example, according to this variant, the character string to be compared Dkn="dog" is in correspondence with the reference character string Drn="dog and cat". In another variant, the database 3 is multilingual and contains, for example, words in French and in English. The logic law then provides that two data items are in correspondence when they are the translation of one another in two languages. For example, according to this variant, the character string to be compared Dkn="dog" is in correspondence with the reference character string Drn="chien".

c) rendering the occurrence counter Qn equal to the number of said sub-base profiles Pk for which the result of said test of correspondence performed in step b) is true. In the example with the field C2, the counter Q2 therefore equals Q2=3.

d) repeating steps a) to c) by selecting another field Cn of the comparison domain which has not yet been selected in step a), if one exists. In the example, by selecting the field C1, we thus obtain Q1=0, then by selecting the field C3, we obtain Q3=2. In a variant (not represented) of the algorithm, the comparison domain DC consists of all those fields of the database 3 with which a data item of the reference profile Pr is associated, with the exclusion of all the fields Cm of the interrogation domain.

In a third step, a distinct partial coefficient αn is calculated for each field Cn of the comparison domain DC whose occurrence counter Qn calculated in the previous step is nonzero (that is to say for the fields C2 and C3 of the example). Each partial coefficient αn is rendered equal to the value F(Qn) taken by a predetermined real weighting function Fx of at least one variable x, when its variable x takes the value of said occurrence counter Qn. Thus, in the example, we obtain the two partial coefficients: α2=F(3) and α3=F(2). The function F(x) can be any real function, polynomial, exponential, logarithmic, or the like. In a preferred embodiment, it is the inverse function F(x)=1/x. In the example, we then obtain: α2=$\frac{1}{3}$ and α3=$\frac{1}{2}$.

In a fourth step, a distinct weighting coefficient is calculated for each profile Pk of the sub-base SB, each weighting coefficient CPk calculated being equal to a sum of distinct partial coefficients αn calculated during the previous step. This sum pertains to the partial coefficients αn of all those of the fields Cn of the comparison domain for which the result of the test of correspondence performed in the second step between the reference profile Pr and the profile Pk to which said weighting coefficient CPk refers is true, and pertaining only to these fields. In the example, for the profile P1, the weighting coefficient CP1 is thus calculated as the sum of the partial coefficients α2 and α3, i.e. CP1=$\frac{1}{3}$+$\frac{1}{2}$=$\frac{5}{6}$. Specifically, the result of the test of correspondence is false for the field C1 since the data item $d_1'$ of the profile P1 is not identical to the data item d1 of the profile Pr. The other weighting coefficients calculated are:

$$CP2=\alpha2+\alpha3=\frac{5}{6}, CP3=\alpha2=\frac{1}{3} \text{ and } CP4=0.$$

In a fifth step, a weighted frequency FPqm is calculated for each data item Dim associated with a field Cm of the interrogation domain in the sub-base SB. In the example, a weighted frequency FP11 is calculated for the data item d.sub.1' and two weighted frequencies FP13 and FP33 are calculated for the data d3 and d.sub.3'. The calculation of the weighted frequencies FPqm comprises the steps consisting, for each field Cm of the interrogation domain (for example the field C1), in:

a) selecting a data item Dqm associated with the field Cm (for example the data item $d_1'$). Said selected data item arises from a profile Pq among the collection of profiles Pk of said sub-base SB which comprise a nonempty data item Dkm associated with the field Cm (in the example, this collection comprises the profiles P1, P3 and P4 for the field C1).

b) assigning the selected data item Dqm a weighted frequency FPqm equal to the sum of the weighting coefficients CPk of the profiles Pk of said collection of profiles whose data item Dkm associated with the field Cm is identical to the selected data item Dqm. Thus for the selected data item $d_1'$, the weighted frequency FP11 is calculated as the sum of the weighting coefficients CP1, CP3 and CP4, since the profiles P1, P3 and P4 comprise the data item $d_1'$ associated with the field C1. We therefore obtain:

$$FP11=\frac{5}{6}+\frac{1}{3}+0=\frac{7}{6}.$$

c) repeating steps a) and b) by selecting another data item which has not yet been selected in step a), if one exists. In the example, a data item associated with the field C3 in a profile is thereafter selected among the collection consisting of the profiles P1 to P4, which all contain a nonempty data item for the field C3. Preferably, one begins by selecting the data item of the profile of this collection whose weighting coefficient is highest, i.e. here from the profile P1 or the profile P2. The selected data item is therefore is d3. The weighted frequency obtained for this data item is FP13=CP1+CP2=$\frac{5}{3}$. For the data item d.sub.3', selected thereafter, we obtain FP33=CP3+CP4=$\frac{1}{3}$. There is then no longer any new data item to be selected and the fifth step is terminated.

In a sixth step, a response 12 to the request 9 is generated by the search terminal TR. The response 12 is generated by extracting from the sub-base SB data, the so-called response data, which are, for each field Cm of the interrogation domain, those which possess the highest weighted frequencies FPqm. A maximum number of response data Dqm associated with each field Cm of the interrogation domain is extracted from the sub-base and included in the response. For example, a maximum of five response data items are supplied for each field Cm of the interrogation domain. Of course, the sub-base SB can contain fewer than the maximum number of different data items associated with the field Cm. In the example, the response 12 generated, represented in FIG. 3, contains the data items d.sub.1', d3 and d.sub.3'.

In a seventh step, a normalized discriminating coefficient δqm, lying between 0 and 100%, is calculated for each response data item Dqm. When the weighting function is the inverse function F(x)=1/x, the normalized discriminating coefficient δqm to which it refers is equal to the weighted frequency FPqm of the response data item Dqm divided by the number NC of distinct fields Cn lying in the comparison domain DC. In the example, we have NC=3 and we obtain the three normalized coefficients: δ11=$\frac{7}{18}$=39%, δ13=$\frac{5}{9}$=56%, δ23=$\frac{1}{9}$=11%. The normalized discriminating coefficients δqm are thereafter included in the response 12, as visible in FIG. 3.

In an optional filtering step, executed after the sixth or after the seventh step, each response data item Dqm is compared with the data item Drm associated with the same field Cm as it in the reference profile Pr. If the response data item Dqm is identical to the reference data item Drm, it is deleted from the response 12. In the example, the data item d3 is then deleted from the response 12 since it is identical to the reference data item d3 associated with the field C3.

In another optional filtering step, executed after the seventh step, any response data item Dqm whose normalized coefficient δqm is less than a predetermined threshold S, for example S=1%, is deleted from the response 12. Thus the response 12 may possibly not comprise any data item associated with one of the interrogation fields Cm, or indeed may be empty.

The response 12, generated according to the algorithm described hereinabove, is finally sent by the network R to the interrogation terminal TI as represented by the arrow 13 of FIG. 1. The various described steps of the algorithm may be executed in another order and/or be nested without changing the resulting response.

There is provision for the interrogation domain to possibly comprise all the fields Cj of the database 3. In this case, the response data of the response 12 may take the form of a response profile, which contains, in association with each field Cj, a data item Dqj whose weighted frequency FPqj is the highest among all the response data associated with the field Cj. This response profile is not a priori identical to any of the profiles Pi stored in the database 3. It represents the profile exhibiting maximum "affinity" with the reference profile Pr, the affinity in question here being defined implicitly by the weighted frequencies and the normalized coefficients.

Each normalized coefficient δqm is in fact intended to represent qualitatively and quantitatively a probability that the user U having generated the reference profile Pr recognizes his own characteristics, tastes and preferences in the data item Dqm by way of response to the question defining the interrogation field Cm. Stated otherwise, the normalized coefficient is, intended to represent a probability that the user U chooses of his own accord the data item Dqm as response to this question, if he has knowledge of the object designated by the data item Dqm and under the proviso that this question does not pertain to an objective item of information (what is your age?), but pertains to a subjective characteristic of the user U (who is your favorite actor?). An advantage of the search engine is that the user U often does not have a priori knowledge of the object, the data item Dqm having been entered into the base 3 by one of the numerous users having a personal profile stored therein. The search engine therefore also provides a decision aid system.

The method for extracting the response data and for calculating the weighted frequencies is a fuzzy logic method based on the idea that a data item appearing in a profile which additionally exhibits shared data in common with the reference profile can be allocated a nonzero probability of corresponding to the characteristics of the user U. When the weighting function F is decreasing, this method is also based on the idea that such a probability is all the larger when said shared data are poorly represented in the collection of profiles Pi of the database 3, and conversely all the smaller when said shared data are standard in the collection of profiles Pi of the database 3.

Figure 4:
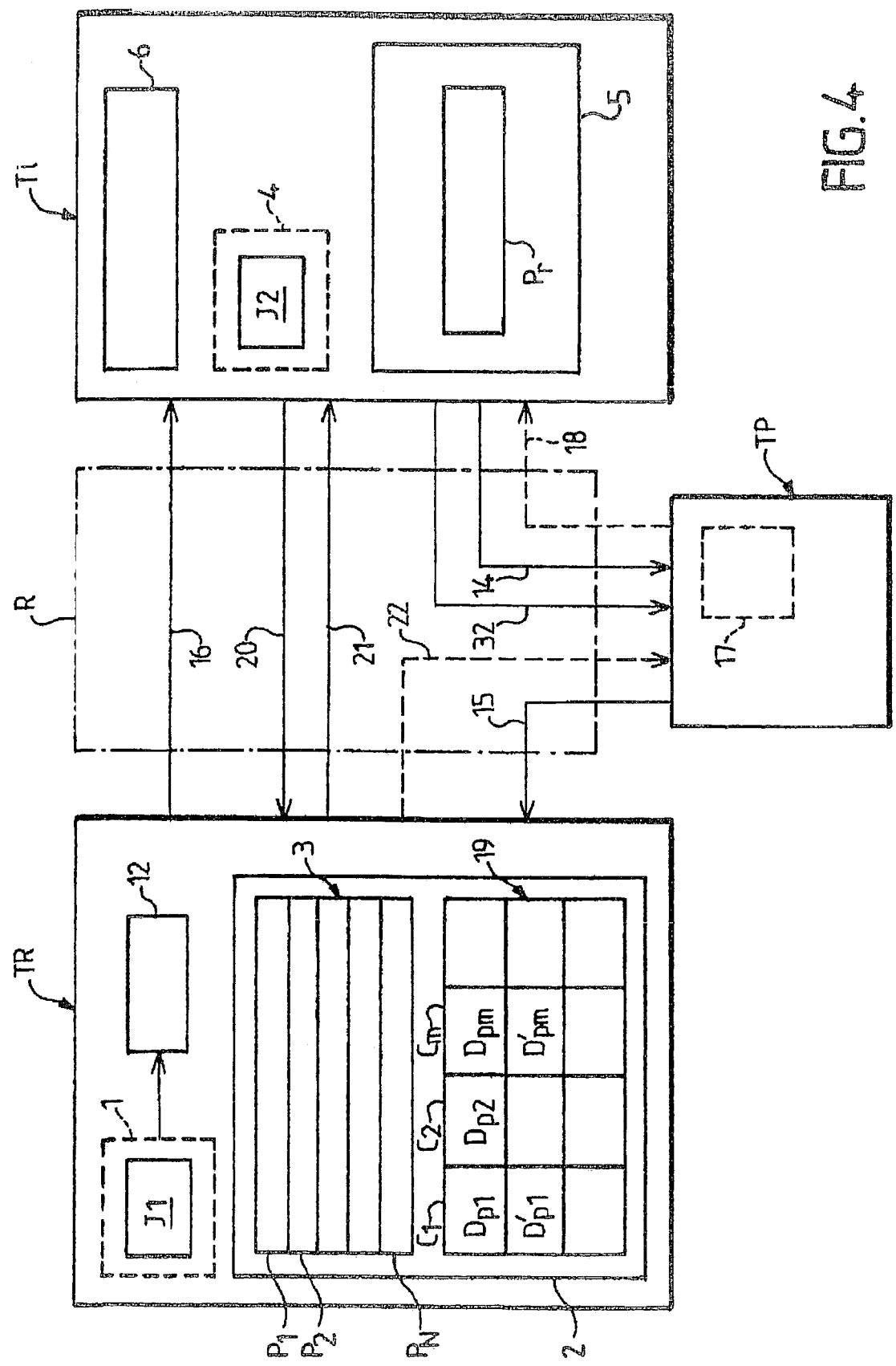
FIG. 4 is an operating diagram of the search engine whose instructions are executed by a search computer terminal linked by a telecommunication network with a partner computer terminal.

Other characteristics of the invention will now be described with reference to FIG. 4. Other computer terminals, the so-called partner terminals TP, of which a single one is represented in FIG. 4, are linked to the telecommunication network R. Each partner terminal TP is preferably intended to receive commands on behalf of a partner supplier able to supply a range of products and/or services to customers. For example, the partner terminal TP is a computer server of an electronic commerce enterprise. A user U of a partner terminal TP who wishes to call upon the search engine can, from his interrogation terminal TI, issue a logon command bound for the partner terminal TP, as represented by the arrow 14. In response to the logon command 14, the partner terminal TP issues a contact command 15 bound for the search terminal TR. In response to the contact command 15, the search terminal TR sends the software module 8 to the interrogation terminal TI, as represented by the arrow 16. As a variant, the software module 8 can be stored in a memory 17 of the partner terminal TP and sent directly by the latter in response to the logon command 14, as represented by the arrow 18.

The software module 8 sent is specific to the partner terminal TP which receives the logon command 14. This software module 8 contains the second set of instruction codes J2 so as to enable the user U to generate his request as described previously. Moreover, it predetermines the fields Cm of the interrogation domain of the request in such a way that said fields pertain to characteristics of the products and/or services to be supplied by the partner supplier. For example, if the partner supplier is a record dealer, an interrogation field pertains to the name of the favorite musician of the user U, the title of his favorite record, etc. The software module 8 also predetermines the accessible fields as a function of the partner supplier.

The search terminal TR comprises a second database 19, joined or otherwise with the base 3, stored in the storage means 2. The second database 19 contains partnerdata Dpj associated with fields Cj of the base 3, in particular partner-data Dpm associated with the predetermined field(s) Cm of the interrogation domain. The partner-data Dpm contain for example the list of all the products and/or services available from the partner supplier. The database 19 also contains complementary data D'pm associated with the partner-data Dpm and pertaining to characteristics of the products and/or services designated by the partnerdata Dpm, for example to the price of said products and/or services. The software module 8 sent contains, for each predetermined accessible field Cj, optional associable data which are extracted from the partner-data Dpj associated with said field Cj. Thus, for a field pertaining to a record title, in order to generate his reference profile, the user U is prompted with titles of records available from the partner supplier.

The user U thereafter sends the search terminal TR the request generated from the interrogation terminal TI with the aid of the software module 8, as represented by the arrow 20. The processing of this request 20 comprises, for example following the abovementioned optional filtering step, a partner-based filtering step, in the course of which each response data item Dqm associated with the field Cm is compared with the partner-data Dpm of the base 19 which are associated with the same field Cm. Any response data item not forming part of the partner-data Dpm of the partner terminal TP from which the contact command 15 originates is deleted from the response 12 in the course of this step. Thus, for example, for the interrogation field pertaining to a record title, the response 12 can contain, on completion of the partner-based filtering step, only titles of records available from said partner supplier. In the course of this step, an address of the partner terminal and/or of the partner supplier, for example in the form of an attribute of the response data or of an HTML link, is included in the response 12. The response 12 is sent to the interrogation terminal TI, as represented by the arrow 21, so that the user U can thereafter get in touch with the partner supplier so as to order the product/service designated in the response 12, as represented by the arrow 32. As a variant, an address of the interrogation terminal TI is included in the response 12 and the latter is sent to the partner terminal TP, as represented by the arrow 22, so that the partner supplier can subsequently get in touch with the user U so as to supply him with information of a commercial or advertising nature which is of relevance to the request 20 issued and/or so as to prompt him to order the product/service designated in the response 12.

The software module 8 also enables a user U of the interrogation terminal TI to stipulate in his request an objective criterion which has to be satisfied by the response data. To do this, the user U can select a characteristic concerning which there exists complementary data D'pm in the base 19, for example the price of the products designated by the partner-data Dpm, and predetermine a criterion to be satisfied by said characteristic, for example a threshold S which must not be exceeded. During the partner-based filtering step, for each response data item which is also a partner-data item Dpm, a logic test consisting in verifying whether the complementary data item D'pm associated with the partner-data item Dpm and pertaining to the selected characteristic fulfills the predetermined criterion. When the result of the logic test is negative, the response data item is excluded from the response 12. For example, if the interrogation field pertains to a record title, the user can stipulate that the records whose titles are supplied in the response 12 will have a price of less than 15 euros.

The search engine is intended to be used jointly by a multitude of interrogation terminals TI1, TI2, . . . and a multitude of partner terminals TP1, TP2, . . . , all linked to the search terminal TR by the telecommunication network R. The computer aided process for making commercial offers with the help of the search engine has several advantages: as the database 3 comprises the profiles of the users of all the partner terminals, it contains data which would not be accessible to each individual partner supplier. Moreover, the base 3 and the search engine use almost none of the memory and computational resources of the partner terminals. Depending on his requirements, each user of one or more interrogation terminals TI generates and/or modifies a profile of the base 3 which is personal to him in the course of multiple requests sent successively by means of the specific software modules 8 of the various partner terminals TP. The accessible fields may be different each time, so that the profile Pi is completed gradually. An advantage of the search engine resides in the fact that all the fields of the comparison domain DC serve to generate the response 12 to the request. When a profile Pi has served to generate several requests successively, the comparison domain DC contains different fields, and generally more of them, than the accessible fields, which are the only ones visible to the user U. This makes it possible to treat a very large number of characteristics of the user U in order to process his request, without asking him for an excessive amount of information to be supplied in one go, or showing him a possibly lengthy list of the data that he has already supplied, which in either case might put him off.

In a variant embodiment (not represented), the search terminal TR comprises the base 19 containing partner-data Dpm designating the commodities available from various partner suppliers. In this case, the interrogation terminal TI enters into communication, directly or indirectly, with the terminal TR, as described previously with reference to FIGS. 1 and 4. In the course of the partner-based filtering step, an address of the partner supplier from whom the product designated by said response data item Dqm is available is appended to each response data item Dqm by the search terminal TR, whomsoever said partner supplier might be.

Figure 5:
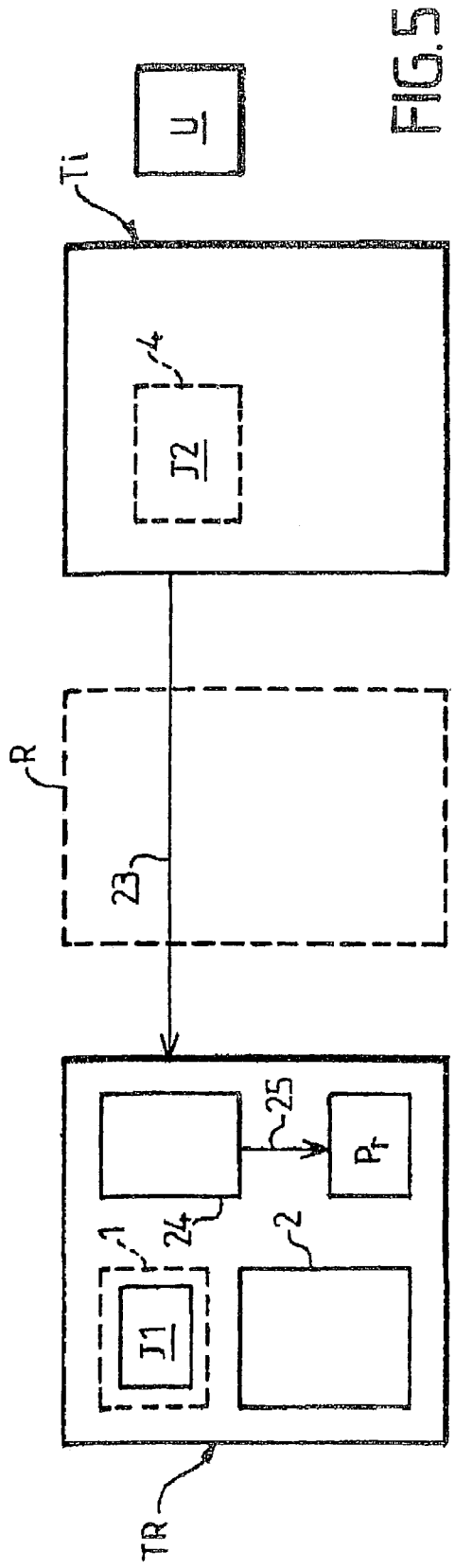
FIG. 5 is an operating diagram of a variant of the search engine comprising a software module for semantic analysis.

In another variant embodiment, represented in FIG. 5, the instruction codes J2 enable the user U to generate a request 24 containing merely a sentence or a group of words, and to send it to the search terminal TR, as indicated by the arrow 23. In this case, the instruction codes J1 are executed by the search terminal TR upon receipt of the request 24 so as to perform a step of semantic recognition in the course of which a reference profile Pr is automatically generated with the aid of the words of the request 24, which are automatically associated with fields Cj of the database 3, as indicated by the arrow 25. The field Cm of the interrogation domain is also defined automatically as a function of the first word of the request 24.

For example, the base 3 comprises the fields C1 pertaining to a favorite restaurant name, the field C2 pertaining to the favorite type of cuisine, and the field C3 pertaining to the favorite animal. The request 24 is expressed: "Italian restaurant which accepts dogs". The automatically generated reference profile comprises "Italian" for the field C2 and "dog" for the field C3, the field C1 being selected automatically as interrogation domain.

Figure 6:
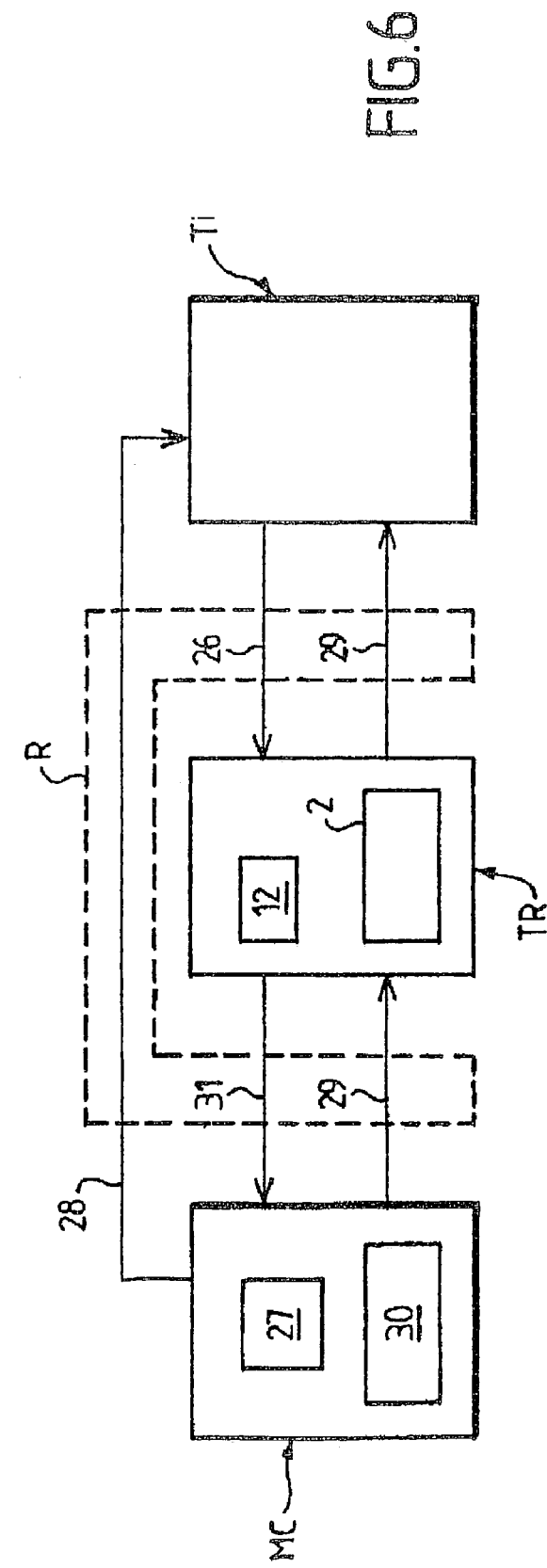
FIG. 6 is an operating diagram of a variant of the search engine of the invention cooperating with a search engine based on key words.

In yet another variant embodiment, represented in FIG. 6, the search terminal TR is linked by the network R to a keywords-based search terminal MC. After generation of the response 12 to a request 26 sent by an interrogation terminal TI, the instruction codes J1 are executed so as to send the response data item Dqm (which is a character string) whose normalized coefficient δqm is a maximum to the terminal MC, as indicated by the arrow 31, so that this terminal can search by keywords for the object designated by the data item Dqm. Conventionally, the terminal MC makes it possible to extract, from a base 30 of electronic documents stored by said terminal, the list 27 of the documents which contain the character string Dqm. Thereafter, the terminal MC sends the list 27 to the interrogation terminal TI, directly or by way of the search terminal TR, as indicated by the arrows 28 and 29 respectively.

Although the invention has been described in conjunction with several particular embodiments, it is obvious that it is in no way limited thereto and that it comprises all the technical equivalents of the means described as well as their combinations if the latter come within the scope of the invention.

The invention claimed is:

1. A program storage medium readable by a computer, tangibly embodying a program of instructions executable by the computer to control the computer to function as:
   a search engine extracting a list of data (12) from a database (3) in response to a request (9, 20, 24, 26),
   said database (3) having a matrix structure and comprising a plurality of rows Pi(i=1 to N) of recorded data Dij, said rows Pi being called profiles, and a plurality of columns Cj (j=1 to M) called fields, each field Cj defining a predetermined category of data Dij which are associated therewith, each profile Pi comprising an identifier Ei for identifying the profile uniquely and data each associated with a field Cj of said database, each profile Pi of the database comprising at least one data item Dij associated with at least one of said fields Cj,
   said search engine comprising a first set (J1) of instruction codes executable by a first computer terminal being called a search terminal (TR), said search terminal (TR) comprising storage means (2) for storing said database and being linked to a telecommunication network (R), so as to perform the successive operations comprising the steps of:
   1) sending, by way of said telecommunication network (R) and bound for a second computer terminal called an interrogation terminal (TI), an interrogation software module (8) containing a second set (J2) of instruction codes executable by said interrogation terminal (TI) so as to:
   1a) construct a reference profile Pr by associating reference data Drj with at least one field Cj among a collection of fields of said database, a collection of accessible fields, the construction of said reference profile Pr being performed by a user (U) of said interrogation terminal (TI);
   1b) send to said search terminal (TR) a request comprising said reference profile Pr and designating an interrogation domain, said interrogation domain comprising at least one field Cm of said database (3), each field Cm of said interrogation domain being one of a preselected field and a user-selected field selected by the user (U) of said interrogation terminal (TI);
   2) reading said request received by way of said telecommunicatiOn network (R);
   3) extracting from said database (3) a sub-base (SB) of profiles Pk to be compared with said reference profile Pr, said sub-base (SB) comprising all or some of the profiles of said database (3);

4) calculating occurrence counters, a distinct occurrence counter Qn being calculated for each field Cn of a comparison domain (DC), said comparison domain (DC) consisting of all said database (3) fields Cj with which a data item Drj of said reference profile Pr is associated, the calculation of the occurrence counters Qn comprising the steps consisting successively in:

4a) selecting a field Cn of said comparison domain (DC), 4b) once for each profile Pk of said subbase (SB), performing a test of correspondence between a reference profile Pr data item Drn associated with said field Cn being called a reference data item, and a data item Dkn of the profile Pk of the sub-base (SB) associated with said field Cn being called a data item to be compared, the result of said test of correspondence being a boolean number, the result of said test being true whenever said data item to be compared Dkn corresponds through a predetermined logic law with said reference data item Drn, the result of said test being false when said data item to be compared is any one of non-correspondence, empty and non-existent, 4c) rendering said occurrence counter Qn equal to the number of said sub-base (SB) profiles Pk for which the result of said test of correspondence performed in step 4b) is true, 4d) repeating steps 4a) to 4c) by selecting another field Cn of the comparison domain (DC) which has not yet been selected in step 4a), if one exists;

5) calculating partial coefficients, a distinct partial coefficient cYn being calculated for each field Cn of said comparison domain (DC) whose occurrence counter Qn calculated in step 4c) is nonzero, each partial coefficient αn being rendered equal to the value F(Qn) taken by a predetermined real weighting function F(x) of at least one variable x, when said variable x takes the value of said occurrence counter Qn;

6) calculating weighting coefficients CPk, a distinct weighting coefficient being calculated for each profile Pk of said sub-base (SB), each weighting coefficient CPk calculated being equal to a sum of distinct partial coefficients αn calculated in step 5), said sum equal to the partial coefficients an of all those of the fields Cn of the comparison domain (DC) for which the result of the test of correspondence performed in step 4) between said reference profile Pr and the profile Pk to which said weighting coefficient CPk refers is true, and pertaining only to these fields;

7) calculating weighted frequencies FPqm, a weighted frequency FPqm being calculated for each data item Dim associated with a field Cm of the interrogation domain in said sub-base (SB) of profiles, the calculation of the weighted frequencies FPqm comprising the steps, for each field Cm of the interrogation domain, of 7a) selecting a data item Dqm associated with said field Cm, said selected data item arising from a profile Pq among the collection of profiles Pk of said sub-base (SB) which comprise a nonempty data item Dkm associated with said field Cm, 7b) assigning said selected data item Dqm a weighted frequency FPqm equal to the sum of the weighting coefficients CPk of the profiles Pk of said collection of profiles whose data item Dkm associated with said field Cm matches to said selected data item Dqm, 7c) repeating steps 7a) and 7b) by selecting another data item which has not yet been selected in step 7a), if one exists;

8) generating a response (12) to said request, said response comprising a list of data Dqm arising from said sub-base (SB) being called a response data, said response data Dqm being those which possess the highest weighted frequencies FPqm among the data associated with the fields Cm of the interrogation domain, a maximum number of response data Dqm associated with each field Cm of the interrogation domain being predetermined and greater than or equal to one;

9) sending said response to a response recipient by way of the telecommunication network (R).

2. The program storage medium as claimed in claim 1, characterized in that said response list is ordered in increasing or decreasing order of the weighted frequencies FPqm of the response data Dqm.

3. The program storage medium as claimed in claim 1, characterized in that said weighting function F(x) of the aforesaid step 5) is a positive function of a single integer variable x, said weighting function being decreasing, equal to the inverse of said integer variable x.

4. The program storage medium as claimed in claim 1, characterized in that said data item to be compared Dkn in the aforesaid step 4b) is in correspondence through said predetermined logic law with said reference data item Drn if it contains at least a substantial part of said reference data item Drn.

5. The program storage medium as claimed in claim 1, characterized in that the codes of said first set (J1) are executable by said search terminal (TR) so as to, in the aforesaid step 8:

a/ calculate normalized coefficients (δqm) lying between 0 and 100%, a normalized coefficient δqm being calculated for each response data item Dqm, the calculation of each normalized coefficient δqm comprising a step consisting in dividing the weighted frequency FPqm of said response data item Dqm by the number NC of distinct fields Cn lying in said comparision domain (DC), b/ include in said generated response (12) the normalized coefficient δqm of each response data item Dqm.

6. The program storage medium as claimed in claim 1, characterized in that the codes of said first set (J1) are executable by said search terminal (TR) so as to filter said response data Dqm, in order to delete from said generated response (12) any response data item Dqm associated with a field Cm and substantially identical to a reference profile Pr data item Drm associated with the same field Cm.

7. The program storage medium as claimed in claim 1, characterized in that the instruction codes of said second set (J2) are executable by said interrogation terminal (TI) so as to store said reference profile Pr and an identifier Er of said reference profile temporarily in a memory (5) of the interrogation terminal (TI), said identifier Er being supplied by a user (U) of said interrogation terminal (TI); and to send said reference profile Pr and said identifier Er to said search terminal (TR).

8. The program storage medium as claimed in claim 7, characterized in that the codes of said first set (J1) are executable by said search terminal (TR) so as to concatenate said reference profile Pr received with said database (3); the concatenation being performed in such a way that, on the one hand, if there exists a profile Pi of said database (3) whose identifier Ei is identical to the identifier Er of said reference profile Pr, the reference data Drj associated with the fields Cj for which there exists no associated data item Dij in the profile Pi are added to said profile Pi; on the other hand, if no profile Pi of said database (3) has an identifier Ei identical to the identifier Er of said reference profile Pr, said reference profile Pr being concatenated as new profile ($P_{N+1}$) of said database (3).

9. The program storage medium as claimed in claim 8, characterized in that said reference profile Pr is concatenated with said database (3) in complete substitution of the profile Pi of said database (3) whose identifier Ei is identical to the identifier Er received when said profile Pi exists.

10. The program storage medium as claimed in claim 1, characterized in that the codes of said first set (J1) are executable by said search terminal (TR) so as, in the course of the aforesaid step 1a) to receive from said interrogation terminal (TI) a profile identifier Ei and to send in response by way of said telecommunication network (R) the profile Pi which is recorded in said database (3) and is identified by said identifier Ei, the instruction codes of said second set (J2) being executable by said interrogation terminal (TI) so as, in the aforesaid step 1a), to use said profile Pi received, possibly modified or completed by a user (U) of said interrogation terminal (TI), as reference profile Pr of a request.

11. The program storage medium as claimed in claim 1, characterized in that said interrogation software module (8) sent to said interrogation terminal (TI) comprises a list of optional data associable with said accessible fields Cj, the instruction codes of said second set (J2) being executable by said interrogation terminal (TI) so as to allow a user (U) of said interrogation terminal (TI) to include said optional data in said reference profile Pr, by associating them with said corresponding accessible fields Cj.

12. The program storage medium as claimed in claim 11, characterized in that, said search terminal (TI) being linked by way of said telecommunication network (R) with at least a third computer terminal, the partner terminal (TP), the codes of said first set (J1) are executable by said search terminal (TR) so as to receive from any partner terminal (TP) a contact command (15), said command comprising an address of an interrogation terminal (TI) and so as to execute said contact command (15) by sending said interrogation software module (8) to said interrogation terminal (TI).

13. The program storage medium as claimed in claim 12, characterized in that the interrogation software module (8) sent by said search terminal (TR) in response to said contact command (15) predetermines at least one of said accessible fields Cj and said fields of the interrogation domain as a function of the partner terminal (TP) from which said contact command (15) originates, said interrogation domain being predetermined so as to pertain to a product or service that said partner terminal (TP) is able to supply.

14. The program storage medium as claimed in claim 12, characterized in that said optional data, contained in the interrogation software module (8) sent by said search terminal (TR) in execution of a contact command (15), comprise partner-data Dpm connected with the partner terminal (TP) from which said contact command (15) originates, said partner-data Dpm arising from a second database (19) stored in said storage means (2) of the search terminal (TR), said partner-data Dpm comprising information about at least one of products and services intended to be supplied by said partner terminal (TP).

15. The program storage medium as claimed in claim 14, characterized in that the codes of said first set (J1) are executable by said search terminal (TR) so as to perform a filtering of said response data Dqm as a function of said partner-data Dpm, the filtering of said response data Dqm comprising the steps consisting i/ in comparing each response data item Dqm with the partnerdata Dpm which are associated with the same field Cm as said response data item Dqm, ii/ when said response data item Dqm is substantially identical to a partner-data item Dpm connected with a partner terminal (TP), in including an address of said partner terminal (TP) in said generated response (12).

16. The program storage medium as claimed in claim 15, characterized in that the filtering of said response data comprises the step consisting in deleting from said generated response (12) each response data item Dqm which is not substantially identical to any of the partner-data items Dpm connected with a predetermined partner terminal (TP), said predetermined partner terminal (TP) being the partner terminal (TP) from which said contact command (15) originates.

17. The program storage medium as claimed in claim 15, characterized in that the filtering of said response data comprises the step consisting in executing a logic test for each response data item Dqm, said logic test consisting in executing a logic test for each response data item Dqm, said logic test consisting in varying whether a complementary data item D'qm stored in said second database (19) fulfills a predetermined criterion, the result of said logic test being a boolean number, said instructions of the first set (J1) being executable by said search terminal (TR) so as to exclude said response data item Dqm from said response (12) if the result of said logic test is false, the instructions of said second set (J2) being executable by said interrogation terminal (TI) so as to allow a user (U) to predetermine said criterion.

18. The program storage medium as claimed in claim 15, characterized in that the codes of said first set (J1) are executable by said search terminal (TR) so as to render a partner terminal (TP), a partner terminal (TP) with which is connected a partner-data item Dpm substantially identical to the response data item Dqm whose weighted frequency FPqm is a maximum, recipient of said response (12) and so as to include an address of said interrogation terminal (TI) in said response (12) sent, so that said partner terminal (TP) can enter into communication with said interrogation terminal (TI) after receipt of said response (12).

19. The program storage medium as claimed in claim 1, characterized in that said interrogation terminal (TI) is a recipient of said response (12).

20. The program storage medium as claimed in claim 1, characterized in that, said search terminal (TI) being linked by way of said telecommunication network (R) with at least a third computer terminal being called a partner terminal (TP), the codes of said first set (J1) are executable by said search terminal (TR) so as to receive from any partner terminal (TP) a contact command (15), said command comprising an address of an interrogation terminal (TI) and so as to execute said contact command (15) by sending said interrogation.software module (8) to said interrogation terminal (TI).

21. Computer aided process for making commercial offers, each commercial offer comprising the name of a commodity to be supplied and the address of a supplier able to supply said commodity, characterized in that it implements the search engine as claimed in claim 1, the storage means (2) of the search terminal (TR) comprising a second database (19) for storing supplier-data Dpm specific to said supplier, said supplier-data Dpm comprising a list of commodities that can be supplied by said supplier, the codes of said first set (J1) being executable by said search terminal (TR) so as to perform, after generation of said response (12), a filtering of said response data Dqm as a function of said supplier-data Dpm, the filtering of said response data Dqm comprising a step consisting in comparing each response data item Dqrn with the supplier-data Dpm which are associated with the same field Cm as said response data item Dqm, in deleting from said response (12) any response data item substantially different from all the supplier-data Dpm and in including an address of said supplier in said response (12) when a response data item Dqm is substantially identical to a supplier-data item Dpm, said commercial offer consisting of said response (12) sent to said interrogation terminal (TI).

* * * * *